United States Patent
Ohashi et al.

[11] Patent Number: 6,143,676
[45] Date of Patent: Nov. 7, 2000

[54] SYNTHETIC SILICA GLASS USED WITH UV-RAYS AND METHOD PRODUCING THE SAME

[75] Inventors: Norio Ohashi; Michiyo Kuriyama; Shigeru Yamagata, all of Koriyama; Shigemasa Sunada, Takefu, all of Japan

[73] Assignees: Heraeus Quarzglas GmbH, Hanau, Germany; Shin-Etsu Quartz Products Co., Ltd., Tokyo, Japan

[21] Appl. No.: 09/214,894

[22] PCT Filed: May 20, 1998

[86] PCT No.: PCT/EP98/02965

§ 371 Date: Jan. 14, 1999

§ 102(e) Date: Jan. 14, 1999

[87] PCT Pub. No.: WO98/52879

PCT Pub. Date: Nov. 26, 1998

[30] Foreign Application Priority Data

May 20, 1997 [JP] Japan ..................................... 9-145938
Aug. 7, 1997 [JP] Japan ..................................... 9-224450

[51] Int. Cl.$^7$ .............................. C03C 3/06; C03B 9/10; C03B 19/14; G02B 1/00

[52] U.S. Cl. .............................. 501/54; 65/17.6; 65/32.1; 65/32.5; 65/67

[58] Field of Search .............................. 501/54; 65/17.6, 65/32.1, 32.5, 67

[56] References Cited

U.S. PATENT DOCUMENTS

| | | |
|---|---|---|
| 3,485,613 | 12/1969 | Herczog et al. . |
| 3,870,497 | 3/1975 | Spiessens . |
| 5,364,433 | 11/1994 | Nishimura et al. ........................ 501/54 |
| 5,683,483 | 11/1997 | Yosiaki et al. ............................ 65/102 |
| 5,696,624 | 12/1997 | Komine et al. . |
| 5,698,484 | 12/1997 | Maxon ....................................... 501/54 |
| 5,702,495 | 12/1997 | Hiraiwa et al. . |
| 5,703,712 | 12/1997 | Komine et al. . |
| 5,790,315 | 8/1998 | Fujinoki et al. ........................ 359/664 |

FOREIGN PATENT DOCUMENTS

| | | |
|---|---|---|
| 0401845 | 6/1990 | European Pat. Off. . |
| 0476218 | 2/1991 | European Pat. Off. . |
| 0483752 | 10/1991 | European Pat. Off. . |
| 0737654 | 10/1996 | European Pat. Off. . |
| 2-102139 | 4/1990 | Japan . |
| 2102139 | 4/1990 | Japan . |
| 6-199539 | 7/1994 | Japan . |
| 7187684 | 7/1995 | Japan . |
| 9-052723 | 2/1997 | Japan . |
| WO9410097 | 5/1994 | WIPO . |
| WO97164382 | 5/1997 | WIPO . |

*Primary Examiner*—Mark L. Bell
*Assistant Examiner*—David Sample
*Attorney, Agent, or Firm*—Milde, Hoffberg & Macklin, LLP

[57] ABSTRACT

An object of the present invention is to provide a synthetic silica glass optical material which exhibits excellent transmittance as well as durability for high output power vacuum ultraviolet rays, being emitted from, for example, ArF excimer lasers and $Xe_2$ excimer lamps, and to provide a method for producing the same. A synthetic silica glass optical material for high output power vacuum ultraviolet rays made from ultra high purity synthetic silica glass for use in the wavelength region of from 165 to 195 nm, containing OH groups at a concentration of from 5 to 300 wtppm with a fluctuation width in OH group concentration ($\Delta$OH/cm) of 10 wtppm or less, containing hydrogen molecules at a concentration of from $1\times10^{17}$ to $1\times10^{19}$ molecule/cm$^3$ with a fluctuation width in hydrogen molecule concentration ($\Delta H_2$/cm) of $1\times10^{17}$ molecule/cm$^3$ or lower, and containing chlorine at a concentration of 50 wtppm or lower. Also claimed is a method for producing the same.

40 Claims, 1 Drawing Sheet

Fig. 1

SYNTHETIC SILICA GLASS USED WITH UV-RAYS AND METHOD PRODUCING THE SAME

INDUSTRIAL FIELD OF APPLICATION

The present invention relates to a synthetic silica glass optical material for use with a high power vacuum ultraviolet rays; in further detail, it relates to an optical material for use as lenses, prisms, windows, reflectors, tubes, etc., which are assembled in an irradiation apparatus using high output power vacuum ultraviolet rays as the light source, such as excimer lasers, excimer lamps, etc., having a wavelength in a range of from 165 to 195 nm.

PRIOR ART

Ultraviolet rays using mercury vapor lamp, such as g-rays and i-rays, have been used heretofore for the light source of photolithography apparatus for patterning electronic circuit patterns on silicon wafers. With increasing fineness in semiconductor devices, however, the aforementioned g-rays and i-rays had limits in increasing resolution. Accordingly, excimer lasers having shorter wavelength had attracted more attention and led to the development of an apparatus for photolithography using a KrF excimer laser. This apparatus is already put into practical stage. Still, however, the degree of integration in semiconductor devices is expected to further increase, and a light source capable of patterning fine patterns 0.2 mm or less in line width is required. Such light sources capable of achieving the requirements are expected to include high output power vacuum ultraviolet rays in the wavelength range of from 165 to 195 nm, for instance, with the principal example being an ArF excimer laser (193 nm), a $Xe_2$ excimer laser (172 nm), an ArCl excimer laser (175 nm), a $Xe_2$ excimer lamp (172 nm), and an ArCl excimer lamp (175 nm), and their development are already under way. However, because the aforementioned high output power vacuum ultraviolet rays are even higher in output power than the ultraviolet rays used in conventional apparatuses of photolithography, the optical materials subjected to the irradiation therefrom suffers an abrupt occurrence of severe damage such as a drop in transmittance, an increase in refractive index, and a generation of deformation, as to make the optical material practically unfeasible.

Furthermore, at present, dry cleaning for semiconductor devices using high output power vacuum ultraviolet rays in the wavelength range of from 165 to 195 nm, for instance, an ArF excimer laser (193 nm), a $Xe_2$ excimer laser (172 nm), an ArCl excimer laser (175 nm), a $Xe_2$ excimer lamp (172 nm), and an ArCl excimer lamp (175 nm), is under development for use as a cleaning method for semiconductor devices. Such cleaning apparatuses require large optical materials for use as windows and tubes. However, with increasing size of optical materials, the damage attributed to high output power vacuum ultraviolet rays also increase as to make the use of the optical materials practically unfeasible. Conventional large silica glasses had limits in practically available size, because they were produced by first preparing a synthetic silica glass ingot by means of either direct method, comprising introducing a high purity silicon compound into an oxyhydrogen flame to effect hydrolysis and directly depositing the thus obtained fine particles of glass on a target; or VAD method, comprising vitrifying and solidifying, in an electric furnace under vacuum, a white-colored opaque soot body prepared by hydrolyzing a high purity silicon compound using an oxyhydrogen flame. The synthetic silica glass ingot thus obtained was then shaped by hot pressing in a vacuum electric furnace using a graphite mold frame, cut into thin-layered sheet materials, and polished. Furthermore, the silica glass sheet material obtained by direct method above contained OH groups at such a high concentration in the range of from 400 to 1000 wt ppm, and suffered damages when subjected to the irradiation of high output power vacuum ultraviolet rays for a long duration of time. That is, optical transmittance decreased due to solarization. Moreover, because ingots were formed into sheets, the content of OH groups fluctuated as such that the fluctuation width amounted to 100 to 400 wt ppm between the central portion and the outer peripheral portion. This led to form heterogeneity in transmittance for vacuum ultraviolet rays and resistance against ultraviolet radiation inside the sheet material, as to make the material practically unfeasible for a dry cleaning apparatus and the like. In case of the silica glass sheet material obtained by the latter method, i.e., the VAD method, it yields a relatively low content of OH groups in the range of form 100 to 400 wt ppm as compared with the product obtained by the direct method, and less fluctuation in OH groups yielding a fluctuation width in the range of from 50 to 200 wt ppm; yet, the content of OH groups and the fluctuation width in concentration of OH groups were still high as to cause heterogeneity in transmittance for vacuum ultraviolet rays and resistance against ultraviolet radiation inside the sheet material. These have been a great hindrance to overcome. Thus, the development of a large silica glass which suffers less damage by high output power vacuum ultraviolet rays, has a high transmittance, and which has excellent uniformity has been keenly demanded.

As an optical material which satisfies the above requirements, the present inventors proposed, in JP-B-Hei 6-48734 (the term "JP-B-" as referred herein signifies an examined published Japanese patent application), an optical member for lasers containing gaseous hydrogen at a concentration of at least $5 \times 10^{16}$ (molecules/$cm^3$) and OH groups at a concentration of 100 wtppm or more; and in JP-B-Hei 6-27013, a synthetic silica glass optical body containing gaseous hydrogen at a concentration of at least $5 \times 10^{16}$ (molecules/$cm^3$) and OH groups at a concentration of 50 wtppm or more, and canceling out the fluctuation distribution in refractive index attributed on the concentration distribution of OH groups by using the fluctuation distribution in refractive index based on fictive temperature, thereby realizing a synthetic silica glass optical body having substantially no fluctuation distribution in refractive index. However, when the proposed body was scaled up to a large optical material exceeding a size of 200 mm in diameter by 30 mm in thickness, it had been found that there generated a heterogeneous distribution in the concentration of hydrogen molecules and OH groups. Then, this caused a difference in initial transmittance as to induce a drop in durability concerning transmittance and refractive index. Moreover, when OH groups are contained in the silica glass optical material at a concentration as high as 100 wtppm or higher, the initial transmittance decreases in the vacuum ultraviolet region as to lower the durability. That is, the optical materials proposed in the aforementioned examined published Japanese patent applications suffered problems of low initial transmittance in the wavelength region of from 165 to 195 nm and poor durability.

Accordingly, the present inventors intensively continued studies, and have found that a synthetic silica glass optical material having high transmittance and excellent durability is available by further increasing the purity of the optical material by reducing the concentration of the impurities to a level lower than that of the optical materials proposed in the aforementioned examined published Japanese patent applications, controlling the concentration of the OH groups and the hydrogen molecules to a specified range, controlling the concentration distribution of the OH groups and the hydrogen molecules to be uniform, and lowering the content of chlorine elements. Moreover, by confining the concentration of OH groups to a range narrower than that above, it has been found that the initial transmittance and durability can be maintained high with respect to, in particular, high output power vacuum ultraviolet rays in a wavelength region of from 165 to 175 nm. The present invention has been accomplished based on these findings.

It is an object of the present invention to provide a silica glass optical material which has high initial transmittance as well as excellent durability for high output power vacuum ultraviolet rays in a wavelength range of from 165 to 195 nm.

It is another object of the present invention to provide a large sheet material of silica-glass which not only is superior in initial transmittance for high output power vacuum ultraviolet rays in the wavelength range of from 165 to 195 nm, but also exhibits excellent durability and uniform characteristics over the wavelength range.

Another object of the present invention is to provide a silica glass optical material which has high initial transmittance as well as excellent durability for high output power vacuum ultraviolet rays in a wavelength range of from 165 to 175 nm.

A still other object of the present invention is to provide a method for producing the aforementioned silica glass optical material.

The object above can be achieved by the present invention, which is a synthetic silica glass optical material for use with high vacuum ultraviolet rays and a method for producing the same, said synthetic silica glass optical material being made from ultra-high purity synthetic silica glass containing OH groups at a concentration of from 5 to 300 wtppm with a fluctuation in OH-group concentration equal to or less than ($\Delta$OH/cm) of 10 wtppm, containing hydrogen molecules at a concentration equal to or less than of from $1\times10^{17}$ to $1\times10^{19}$ molecule/cm$^3$ with a fluctuation in hydrogen molecule concentration equal to or less than ($\Delta H_2$/cm) of $1\times10^{17}$ molecule/cm$^3$, and containing chlorine at a concentration equal to or less than 50 wtppm.

The synthetic silica glass optical material according to the present invention exhibits high initial transmittance and has excellent durability for high output power ultraviolet rays, but the aforementioned high output power ultraviolet rays refers to ultraviolet rays in the wavelength range of from 165 to 195 nm, such as those emitted from an ArF excimer laser (193 nm), a Xe$_2$ excimer laser (172 nm), an ArCl excimer laser (175 nm), a Xe$_2$ excimer lamp (172 nm), and an ArCl excimer lamp (175 nm). Moreover, the aforementioned ultrahigh purity signifies that the concentration for each of the alkali metal elements of Li, Na, and K is 5 wtppb or lower, that the concentration for each of the alkaline earth elements of Mg, Ca, and Sr is 1 wtppb or lower, and that the concentration for each of the transition metal elements of Ti, Cr, Mn, Fe, Co, Ni, and Cu is 0.1 wtppb or lower.

The synthetic silica glass optical material according to the present invention is of ultra-high purity defined above, contains OH groups at a concentration of from 5 to 300 wtppm, has a fluctuation in OH-group concentration ($\Delta$OH/cm) equal to or less than 10 wtppm, contains hydrogen molecules at a concentration of from $1\times10^{17}$ to $1\times10^{19}$ molecule/cm$^3$ with a fluctuation in hydrogen molecule concentration ($\Delta H_2$/cm) equal to or less than $1\times10^{17}$ molecule/cm$^3$, and contains chlorine at a concentration equal to or less than 50 wtppm.

In general, OH groups constitutes the structural terminal end portion of the silica glass network structure, and in case a proper quantity of OH groups is contained in silica glass, they remove the internal strain of the network structure such that the Si—O—Si binding angle approaches a stable value, and the average Si—O bonding energy increases. On the other hand, OH groups function as to shift the ultraviolet absorption edge to the longer wavelength side, and the presence of OH groups in high concentration decreases the transmittance. Accordingly, in the synthetic silica glass optical material according to the present invention, the concentration of the OH groups is confined in a range of from 5 to 300 wtppm. Particularly, in case of an optical material for high output power ultraviolet rays in a wavelength range of from 165 to 175 nm, the concentration of OH groups is preferably in a range of from 5 to 100 wtppm. If there should be a difference in the concentration of OH groups, the initial characteristics of the optical material is impaired due to the difference in transmittance, absolute refractive index, and the concentration of hydrogen molecules. Furthermore, there generates a difference in the drop of optical transmittance and a difference in the increase of refractive index as to considerably impair the durability. Thus, the fluctuation in OH-group concentration per 1 cm as observed from the direction of the axis of incident light ($\Delta$OH/cm) is controlled to be in a range equal to or less than 10 wtppm, and the fluctuation in OH-group concentration of the entire optical material ($\Delta$OH) is controlled to be equal to or less than 30 wtppm.

Furthermore, because the generation of E-center absorption band is suppressed by the dissolution of hydrogen molecules in the synthetic silica glass, the concentration of hydrogen molecules in the synthetic silica glass optical material according to the present invention is controlled to fall in a range of from $1\times10^{17}$ to $1\times10^{19}$ molecule/cm$^3$. As a matter of course, the dissolution of the hydrogen molecules should be uniform, and thus, the fluctuation in hydrogen molecule concentration per 1 cm as observed from the direction of the axis of incident light ($\Delta H_2$/cm) is preferably equal to or less than $1\times10^{17}$ molecule/cm$^3$ or lower, and the fluctuation in hydrogen molecule concentration for the entire optical material ($\Delta H_2$) is preferably equal to or less than $3\times10^{17}$ molecule/cm$^3$.

In addition to above, the chlorine concentration of the synthetic silica glass optical material according to the present invention is controlled to equal to or less than 50 wtppm. Similar to OH groups, chlorine atoms in silica glass constitute the structural terminal end portion of the silica glass network structure. However, since the bond energy of Si—Cl is small as compared with the bond energy of Si—OH, Si—Cl functions as a precursor for generating the absorption band at 210 nm, i.e., the so-called E-center absorption band under the irradiation of high output power vacuum ultraviolet rays. To suppress this, the content of chlorine element is confined in the aforementioned range.

To further increase the durability, the synthetic silica glass optical material according to the present invention is set to have a fictive temperature in a range of from 700 to 1000° C., with a fluctuation within 50° C. The durability of synthetic silica glass can be increased by setting the fictive temperature low. However, a low fictive temperature requires a longer process time; thus, from the practical viewpoint, the lower limit of fictive temperature is preferably set at 700° C.

In case of using the synthetic silica glass according to the present invention for the optical material of an apparatus for use in lithography, it is preferred that the material has, in addition to the aforementioned characteristics, a structure that is free of striae in three directions, a fluctuation in refractive index ($\Delta n$) equal to or less than $2\times10^{-6}$, and a birefringence equal to or less than 1 nm/cm.

In addition, by controlling the concentration of water molecules to $1\times10^{17}$ at the maximum, the shift of ultraviolet absorption edge to the longer wavelength side attributed to water molecules can be favorably suppressed. It should be noted, however, that water molecules as referred herein are not OH groups bonded to Si, but are molecules dissolved in the interstices of the silica glass network structure.

The synthetic silica glass optical material for high output power vacuum ultraviolet rays according to the present invention can be produced by the following methods. That is, (i) Soot Remelting method An ultra-high purity silicon compound purified by means of distillation and the like, such as $SiCl_4$, $HSiCl_3$, $(CH_3)_2SiCl_2$, $CH_3SiCl_3$, $CH_3Si(OCH_3)_3$, $HSi(OCH_3)_3$, and $Si(OCH_3)_4$, preferably those free of chlorine, i.e., $CH_3Si(OCH_3)_3$, $HSi(OCH)_3$, and $Si(OCH_3)_4$, is subjected to flame hydrolysis using gaseous oxyhydrogen or gaseous propane to prepare a white opaque soot body. After controlling the concentration of OH groups of the thus obtained soot body in an electric furnace, the resulting body is heated to a temperature range of from 1300 to 1700° C. in the same electric furnace under vacuum to prepare a synthetic silica glass ingot free of pores. The ingot is then drawn into a rod-like silica glass ingot described in, for example, JP-A-Hei 3-88742 (the term "JP-A-" represents "an unexamined published Japanese patent application") and U.S. Pat. No. 3,485,613 and is set on a lathe, such that it is sequentially softened and molten in a zone to perform a homogenization treatment for the OH-group concentration by means of floating zone (FZ) method which comprises rotating and stirring the rod-like silica glass ingot. Uniform OH-group concentration as well as removal of striae is realized by performing FZ method. The resulting silica glass ingot is heated in the electric furnace in the temperature range of from 600 to 1200° C. under normal pressure or high pressure gaseous hydrogen to homogenize the concentration of hydrogen molecules and fictive temperature, and is cut, ground, and polished to obtain a silica glass optical material of the predetermined dimension.

(ii) Direct method

The ultra-high purity silicon compound above is sprayed into an oxyhydrogen flame or propane gas flame, and the fine particles of glass thus obtained by hydrolysis is deposited on a target to directly obtain a transparent synthetic silica glass ingot. The resulting ingot is subjected to homogenization of OH groups and to removal of striae in the same manner as above, it is further homogenized in the concentration of hydrogen molecules and subjected to a treatment of setting fictive temperature. The ingot is then cut, ground, and polished to obtain a silica glass optical material of the predetermined dimension.

Figure 1:
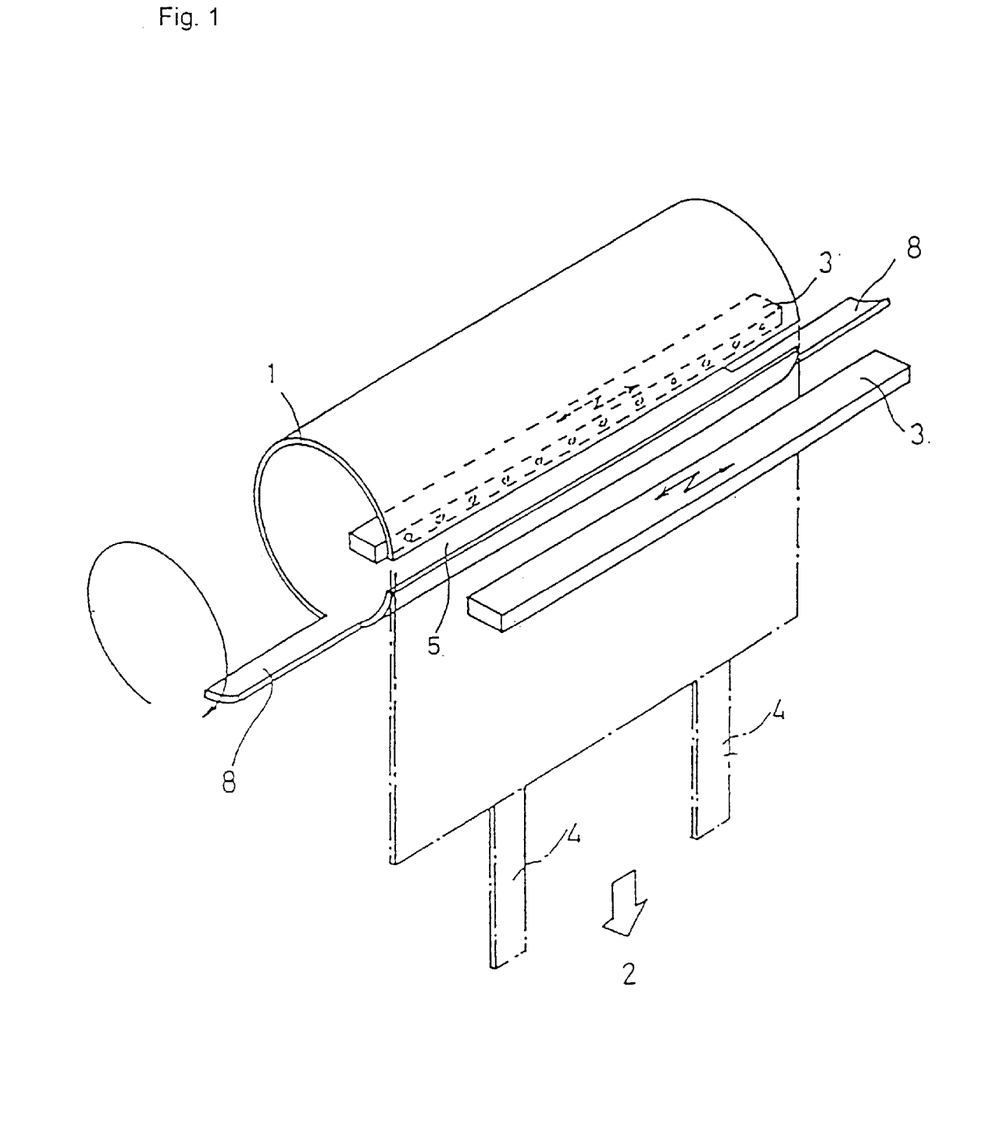
FIG. 1 is a schematic diagram showing a tube opening mold process for the production of sheet material.

(iii) Production of synthetic silica glass cylinder and of a large sheet material A synthetic silica glass cylinder is produced by the soot remelting method. A large white opaque soot body is prepared on a rod-like target, while controlling the concentration of OH groups to be uniform along the axial direction by means of burner swinging in accordance with the production method described in, for example, JP-A-Hei 4-260618 and U.S. Pat. No. 5,609,666. During the formation of the large soot body, the concentration of OH groups is controlled by adjusting the temperature inside the electric furnace, the duration of time, and the vacuum degree. The resulting body is then heated to a temperature range of from 1500 to 1700° C. in the same electric furnace under vacuum to fuse and prepare a hollow cylinder-like body having an outer diameter of from 80 to 200 mm and a wall thickness of from about 20 to 70 mm. A large tube having an outer diameter of from 200 to 400 mm and a wall thickness of from about 3 to 10 mm is shaped by heating and tube drawing, while controlling the inner pressure of the aforementioned hollow cylinder-like synthetic silica glass body using gaseous $N_2$. A cutting is introduced in the thus obtained large tube over a predetermined width along the axial direction of the tube, and while sequentially heating and softening the tube from the inner and the outer sides of the cut portion over the tube peripheral direction by using a linear burner, the tube is pulled apart along the tangential line of the tube to produce a flat sheet by tube opening treatment as shown in FIG. 1, thereby obtaining a large sheet material of synthetic silica glass. FIG. 1 shows a silica glass tube 1, the direction of pulling the sheet material 2, a heating means 3, and a cut portion 4. The thus obtained large synthetic silica glass sheet material is then subjected to the treatment of removing strain, etching cleaning, and heat treatment. It is finally subjected to mirror polishing to obtain a 300×300 mm to 1000×1000 mm square and 2 to 8 mm thick large synthetic silica glass sheet material. The resulting large sheet material comprises a sheet plane corresponding to the axial direction having a controlled OH group concentration. Thus, a uniform fluctuation width in the concentration of OH groups of 10 wt ppm or lower is obtained for the planar plane. On the other hand, the large fluctuation width in the concentration of OH groups which was present in the direction of the tube diameter remains as the fluctuation width in the thickness direction of the large sheet material. Because the sheet material is as thin as to yield a thickness of from 2 to 8 mm and the concentration of OH groups gradually increase or decrease uniformly, the unevenness is small for the transmittance of high output power vacuum ultraviolet rays and for the degree of solarization ascribed thereto; thus, a sheet material having uniform properties in the plane direction can be obtained.

PREFERRED EMBODIMENT OF THE INVENTION

The present invention is described in detail by making reference to practical examples below, but the present invention is not only limited thereto.

EXAMPLES 1 TO 4

(1) Preparation of soot body

A soot body was prepared by supplying an ultra-high purity gaseous $CH_3Si(OCH_3)_3$ obtained by distillation purification to a plurality of burners at a fixed flow rate in total of 100 liter/minute, together with gaseous oxygen and gaseous hydrogen each flown at a rate of 10 to 100 liter/minute and 30 to 300 liter/minute. Thus was obtained a white soot body containing several hundreds of ppm by wt (wtppm) of OH groups.

(2) Production of silica glass ingot

The soot body thus obtained above was placed inside a stainless steel electric furnace having a built-in cylindrical high-purity graphite heater, and heat treatment was performed thereon in the temperature range of from about 600 to 900° C. while setting the inside of the electric furnace at a vacuum degree of about 103 Pa or lower, to thereby control the concentration of OH groups. The concentration of OH groups was controlled by adjusting the degree of vacuum, temperature, and the duration of the process. Then, the resulting body was heated and remolten in the temperature range of from about 1400 to 1600° C. inside the electric furnace under vacuum, to thereby obtain a transparent silica glass ingot.

(3) Homogenization treatment of OH-group concentration and treatment for removing striae The silica glass ingot was prepared into a rod-like body about 60 mm in diameter, and the resulting ingot was set on a lathe to subject it to zone melting using oxyhydrogen burner-heating to perform homogenization treatment of OH-group concentration and treatment for removing striae. The resulting ingot was then shaped into a cylindrical body 300 mm in diameter and 60 mm in thickness.

(4) Homogenization treatment of hydrogen molecule concentration and treatment for setting fictive temperature The cylindrical silica glass ingot was introduced into an electric furnace equipped with a stainless steel jacket and a tungsten mesh heater. The treatment was performed under an internal atmosphere of, in Example 1, 100% gaseous hydrogen at a pressure of 1 kgf/cm$^2$ (about 0.1 MPa), and in Example 2, 100% gaseous hydrogen at a pressure of 10 kgf/cm$^2$ (about 1 MPa), by heating first to 1100° C., holding at the temperature for a duration of 50 hours, gradually cooling to 800° C. over a time duration of from 200 to 1000 hours, and naturally cooling to room temperature while maintaining the same atmosphere. The resulting cylindrical silica glass ingot was subjected to surface grinding and parallel planes grinding to obtain a silica glass optical material 250 mm in diameter and 50 mm in thickness.

EXAMPLES 5 AND 6

(1) Production of silica glass ingot

Ultrahigh purity gaseous CH$_3$Si(OCH$_3$)$_3$ obtained by distillation purification was supplied at a fixed flow rate of 150 liter/minute, together with gaseous oxygen and gaseous hydrogen each flown at a rate of 10 to 100 liter/minute and 100 to 300 liter/minute. Thus was produced a transparent silica glass ingot by direct method.

(2) Homogenization treatment of OH-group concentration and treatment for removing striae The transparent silica glass ingot above was prepared into a rod-like body about 60 mm in diameter, and the resulting body was set on a lathe to perform homogenization treatment of OH-group concentration and treatment for removing striae by means of floating zone method using an oxyhydrogen burner. Thus was obtained a cylindrical body 300 mm in diameter and 60 mm in thickness.

(3) Homogenization treatment of hydrogen molecule concentration and treatment for setting fictive temperature In Example 5, the cylindrical silica glass ingot was introduced into an electric furnace equipped with a stainless steel jacket and a tungsten mesh heater. The treatment was performed under an internal atmosphere of 100% gaseous hydrogen at a pressure of 10 kgf/cm$^2$ (about 1 MPa), holding at the temperature for a duration of 50 hours, gradually cooling to 800° C. over a time duration of from 100 to 500 hours, and naturally cooling to room temperature while maintaining the same atmosphere. In Example 6, the cylindrical silica glass ingot was placed in a stainless steel autoclave whose inner atmosphere was controlled to 100% gaseous hydrogen at a pressure of 500 kgf/cm2 (about 50 MPa), where the temperature was elevated to 1100° C. by using an external heater, maintained at the temperature for a duration of 50 hours, gradually lowered to 800° C. over a time duration of from 100 to 500 hours, and finally lowered to room temperature while maintaining the atmosphere. Then, the thus obtained cylindrical silica glass was subjected to surface grinding and parallel planes grinding to obtain a silica glass optical material 250 mm in diameter and 50 mm in thickness.

The optical glass optical materials obtained above were subjected to measurements to obtain average concentration of OH groups, fluctuation width in concentration of OH groups ($\Delta$OH/cm), fluctuation width in concentration of OH groups of the entire optical material ($\Delta$OH), average concentration of hydrogen molecules, fluctuation width in concentration of hydrogen molecules ($\Delta$H$_2$/cm), fluctuation width in concentration of hydrogen molecules of the entire optical material ($\Delta$H$_2$), content of chlorine element, fictive temperature (T$_f$) and fluctuation width of the fictive temperature ($\Delta$T$_f$), difference in refractive index ($\Delta$n), birefringence in visual rays (nm/cm), and transmittance and the like for the irradiation of ArF excimer laser and Xe$_2$ excimer laser. The results are shown in Table 1.

The concentration of impurity elements was obtained for the silica glass optical material described in Example 3 and the same described in Example 5. The former contained 1 wt ppb of Li, 4 wt ppb of Na, less than 1 wtppb of K, less than 1 wt ppb each of Mg and Ca, less than 0.1 wt ppb of Sr, and less than 0.1 wt ppb each of Ti, Cr, Mn, Fe, Co, Ni, and Cu. The latter material contained 1 wt ppb of Li, 2 wt ppb of Na, less than 1 wtppb of K, less than 1 wt ppb each of Mg and Ca, less than 0.1 wt ppb of Sr, and less than 0.1 wt ppb each of Ti, Cr, Mn, Fe, Co, Ni, and Cu.

TABLE 1

|  | Example 1 | Example 2 | Example 3 | Example 4 | Example 5 | Example 6 |
| --- | --- | --- | --- | --- | --- | --- |
| Method of Synthesis | Remelting* | Remelting* | Remelting* | Remelting* | DQ method** | DQ method** |
| Size ($\phi$ xt) | 250 × 50 | 250 × 50 | 250 × 50 | 250 × 50 | 250 × 50 | 250 × 50 |
| Av. concentration of OH-groups (wt ppm) | 5 | 50 | 100 | 250 | 300 | 300 |
| $\Delta$OH/cm (wt ppm) | $\leq$1 | $\leq$5 | $\leq$5 | $\leq$10 | $\leq$10 | $\leq$10 |
| $\Delta$OH (wt ppm) | $\leq$1 | 20 | 20 | 30 | 30 | 30 |
| Av. concentration of H (molecule/cm$^3$) | 2 × 10$^{17}$ | 2 × 10$^{18}$ | 2 × 10$^{18}$ | 2 × 10$^{18}$ | 2 × 10$^{18}$ | 1 × 10$^{19}$ |

TABLE 1-continued

|  | Example 1 | Example 2 | Example 3 | Example 4 | Example 5 | Example 6 |
|---|---|---|---|---|---|---|
| $\Delta H_2$/cm (molecule/cm$^3$) | $\leq 1 \times 10^{18}$ | $\leq 1 \times 10^{17}$ | $\leq 1 \times 10^{17}$ | $\leq 1 \times 10^{17}$ | $\leq 1 \times 10^{17}$ | $\leq 1 \times 10^{17}$ |
| $\Delta H_2$ (molecule/cm$^3$) | $5 \times 10^{18}$ | $2 \times 10^{17}$ | $2 \times 10^{17}$ | $2 \times 10^{17}$ | $3 \times 10^{17}$ | $3 \times 10^{17}$ |
| Cl concentration (wt ppm) | <10 | <10 | <10 | <10 | <10 | <10 |
| $\Delta n$ | $2 \times 10^{-6}$ | $2 \times 10^{-6}$ | $2 \times 10^{-6}$ | $2 \times 10^{-6}$ | $2 \times 10^{-6}$ | $2 \times 10^{-6}$ |
| Birefringence (nm/cm) | 1 | $\leq 1$ | $\leq 1$ | <1 | <1 | <1 |
| Av. of fictive temperature (° C.) | 840 | 820 | 820 | 820 | 820 | 820 |
| Fluctuation width of fictive temperature (° C.) | 10 | 10 | 10 | 10 | 10 | 10 |
| ArF laser irradiation | | | | | | |
| Initial transmittance (%) | 90 | 90 | 90 | 90 | 90 | 90 |
| Transmittance after irradiation (%) | 87 | 89 | 90 | 90 | 89 | 89 |
| Xe$_2$ lamp irradiation | | | | | | |
| Initial transmittance (%) | 88 | 87 | 86 | 85 | 84 | 84 |
| Transmittance after irradiation (%) | 87 | 87 | 86 | 83 | 80 | 81 |

(Note)
*"Remelting" represents "Soot remelting method"
***"DQ method" represents "Direct method"

COMPARATIVE EXAMPLE 1

A soot body was prepared by using the ultra-high purity silicon compound utilized in Example 1, and ultra-high purity synthetic silica glass ingot was produced under gaseous hydrochloride atmosphere by means of soot remelting process inclusive of dehydration treatment. Thus, an optical material 250 mm in diameter and 50 mm in thickness was obtained in the same manner as that described in Example 1, except for not performing the homogenization treatment for OH group concentration and hydrogen molecule concentration. The optical glass optical material obtained above was subjected to measurements to obtain average concentration of OH groups, fluctuation width in concentration of OH groups ($\Delta$OH/cm), fluctuation width in concentration of OH groups of the entire optical material ($\Delta$OH), average concentration of hydrogen molecules, fluctuation width in concentration of hydrogen molecules ($\Delta H_2$/cm), fluctuation width in concentration of hydrogen molecules of the entire optical material ($\Delta H_2$), content of chlorine element, fictive temperature ($T_f$) and fluctuation width of the fictive temperature ($\Delta T_f$), difference in refractive index ($\Delta n$), birefringence in visual rays (nm/cm), and transmittance and the like for the irradiation of ArF excimer laser and Xe$_2$ excimer laser. The results are shown in Table 2.

COMPARATIVE EXAMPLE 2

A synthetic silica glass ingot free of OH groups was prepared in the same manner as the process described in Comparative Example 1, and after performing a treatment for removing striae, homogenization treatment for the concentration of hydrogen molecules, and setting of fictive temperature, it was cut into a piece 250 mm in diameter and 50 mm in thickness. An optical material was thus obtained by applying grinding and polishing treatments to the resulting cut ingot. The optical glass optical material obtained above was subjected to measurements to obtain average concentration of OH groups, fluctuation width in concentration of OH groups ($\Delta$OH/cm), fluctuation width in concentration of OH groups of the entire optical material ($\Delta$OH), average concentration of hydrogen molecules, fluctuation width in concentration of hydrogen molecules ($\Delta H_2$/cm), fluctuation width in concentration of hydrogen molecules of the entire optical material ($\Delta H_2$), content of chlorine element, fictive temperature ($T_f$) and fluctuation width of the fictive temperature ($\Delta T_f$), difference in refractive index ($\Delta n$), birefringence in visual rays (nm/cm), and transmittance and the like for the irradiation of ArF excimer laser and Xe$_2$ excimer laser. The results are shown in Table 2.

COMPARATIVE EXAMPLES 3 AND 4

Synthetic silica glass ingots were prepared in the same manner as in Example 3, wherein homogenization treatment for OH group concentration, treatment for removing striae, and treatment for setting fictive temperature by heating under ambient atmosphere were performed in Comparative Example 3, whereas homogenization treatment for hydrogen molecule concentration and treatment for setting fictive temperature were performed in Comparative Example 4. The ingots were cut into a piece of 250 mm in diameter and 50 mm in thickness, ground, and polished to obtain the optical materials. The optical glass optical material obtained above was subjected to measurements to obtain average concentration of OH groups, fluctuation width in concentration of OH groups ($\Delta$OH/cm), fluctuation width in concentration of OH groups of the entire optical material ($\Delta$OH), average concentration of hydrogen molecules, fluctuation width in concentration of hydrogen molecules ($\Delta H_2$/cm), fluctuation width in concentration of hydrogen molecules of the entire optical material ($\Delta H_2$), content of chlorine element, fictive temperature ($T_f$) and fluctuation width of the fictive temperature ($\Delta T_f$), difference in refractive index ($\Delta n$), birefringence in visual rays (nm/cm), and transmittance and the like for the irradiation of ArF excimer laser and $Xe_2$ excimer laser. The results are shown in Table 2.

COMPARATIVE EXAMPLES 5 AND 6

Synthetic silica glass ingots were prepared in the same manner as in Example 5, wherein homogenization treatment for hydrogen molecule concentration and treatment for setting fictive temperature were performed in Comparative Example 5, whereas homogenization treatment for OH group concentration, treatment for removing striae, homogenization treatment for hydrogen molecule concentration, and treatment for setting fictive temperature were performed in Comparative Example 6. The ingots were cut into a piece of 250 mm in diameter and 50 mm in thickness, ground, and polished to obtain the optical materials. The optical glass optical material obtained above was subjected to measurements to obtain average concentration of OH groups, fluctuation width in concentration of OH groups ($\Delta OH$/cm), fluctuation width in concentration of OH groups of the entire optical material ($\Delta OH$), average concentration of hydrogen molecules, fluctuation width in concentration of hydrogen molecules ($\Delta H_2$/cm), fluctuation width in concentration of hydrogen molecules of the entire optical material ($\Delta H_2$), content of chlorine element, fictive temperature ($T_f$) and fluctuation width of the fictive temperature ($\Delta T_f$), difference in refractive index ($\Delta n$), birefringence in visual rays (nm/cm), and transmittance and the like for the irradiation of ArF excimer laser and $Xe_2$ excimer laser. The results are shown in Table 2.

TABLE 2

| | Comp. Example 1 | Comp. Example 2 | Comp. Example 3 | Comp. Example 4 | Comp. Example 5 | Comp. Example 6 |
|---|---|---|---|---|---|---|
| Method of Synthesis | Remelting* | Remelting* | Remelting* | Remelting* | DQ method** | DQ method** |
| Size ($\phi$ xt) | 250 × 50 | 250 × 50 | 250 × 50 | 250 × 50 | 250 × 50 | 250 × 50 |
| Av. concentration of OH-groups (wt ppm) | <1 | <1 | 100 | 100 | 300 | 500 |
| $\Delta OH$/cm (wt ppm) | <1 | <1 | <5 | <50 | <100 | <10 |
| $\Delta OH$ (wt ppm) | <1 | <1 | 20 | 100 | 400 | 30 |
| Av. concentration of $H_2$ (molecule/cm$^3$) | <1 × 10$^{16}$ | 2 × 10$^{17}$ | <1 × 10$^{16}$ | 2 × 10$^{17}$ | 2 × 10$^{18}$ | 2 × 10$^{18}$ |
| $\Delta H_2$/cm (molecule/cm$^3$) | <1 × 10$^{16}$ | ≦3 × 10$^{16}$ | <1 × 10$^{16}$ | ≦2 × 10$^{17}$ | <5 × 10$^{17}$ | ≦2 × 10$^{17}$ |
| $\Delta H_2$ (molecule/cm$^3$) | <1 × 10$^{16}$ | 5 × 10$^{16}$ | <1 × 10$^{16}$ | 6 × 10$^{17}$ | 2 × 10$^{16}$ | 4 × 10$^{17}$ |
| Cl concentration (wt ppm) | 1.200 | 1.200 | <10 | <10 | <10 | <10 |
| $\Delta n$ | 5 × 10$^{-6}$ | 2 × 10$^{-6}$ | 2 × 10$^{-6}$ | 5 × 10$^{-6}$ | 6 × 10$^{-6}$ | 2 × 10$^{-6}$ |
| Birefringence (nm/cm) | 3 | 1 | ≦1 | 5 | 5 | ≦1 |
| Av. of fictive temperature (° C.) | 860 | 860 | 840 | 840 | 820 | 820 |
| Fluctuation width of fictive temperature (° C.) | 10 | 10 | 10 | 10 | 10 | 10 |
| ArF laser irradiation | | | | | | |
| Initial transmittance (%) | 90 | 90 | 90 | 90 | 90 | 90 |
| Transmittance after irradiation (%) | 56 | 60 | 75 | 82~88 | 86~88 | 88 |
| $Xe_2$ lamp irradiation | | | | | | |
| Initial transmittance (%) | <5 | <5 | 86 | 86 | 83 | 74 |
| Transmittance after irradiation (%) | <5 | <5 | 52 | 75~84 | 72~79 | 62 |

(Note)
*"Remelting" represents "Soot remelting method"
**"DQ method" represents "Direct method"

Evaluation

Tables 1 and 2 read that the optical materials according to the present invention have excellent resistance against excimer radiation even when the material is scaled up to a large size. Particularly, the optical materials described in Examples 3 and 4 exhibit excellent resistance against ArF excimer lasers, while those of Examples 2 and 3 are superior in resistance against $Xe_2$ excimer lamp. Moreover, the optical materials according to Examples 3 and 4 show no fluctuation in refractive index even after irradiating an ArF excimer laser, showing a stable distribution with $\Delta n$ of 2×10$^{-6}$.

On the other hand, the synthetic silica glass optical material described in Comparative Examples 1 to 6 are inferior in resistances against ArF excimer laser and $Xe_2$ excimer lamp. Moreover, the distribution in refractive index after irradiating an ArF excimer laser becomes heterogeneous.

The synthetic silica glass optical material according to the present invention is useful as an optical material for high output power vacuum ultraviolet rays, because it exhibits not only excellent initial transmittance for high output power vacuum ultraviolet rays in the wavelength range of from 165 to 195 nm, but also high durability. Moreover, the optical material according to the present invention is highly valuable in the industry, because it can be easily produced by applying a conventionally well known flame hydrolysis and the like to an ultra-high purity silicon compound used as the starting material.

In the following preparation of large sheet material made from synthetic silica glass cylinder is described in more detail:

A large white-colored soot body was prepared by supplying an ultra-high purity gaseous $CH_3Si(OCH_3)_3$ obtained by distillation purification to a plurality of burners at a fixed flow rate in total of 150 liter/minute, together with gaseous oxygen and gaseous hydrogen each flown at a rate of 10 to 100 liter/minute and 30 to 300 liter/minute. The white-colored large soot body containing several hundred parts per million by weight (wt ppm) of OH group was formed by outside deposition method described in JP-A-Hei 4-260618 while swinging the burners. The large soot body was placed inside a stainless steel electric furnace having a built-in cylindrical high-purity graphite heater, and heat treatment was performed thereon in the temperature range of from about 600 to 900° C. while setting the inside of the electric furnace at a vacuum degree of about 103 Pa or lower, to thereby control the concentration of OH groups. The concentration of OH groups was controlled by adjusting the vacuum degree, the temperature, and the duration of the process. Then, the resulting body was heated and remolten in the temperature range of from about 1500 to 1700° C. inside the electric furnace under vacuum, to thereby obtain a synthetic silica glass hollow cylinder having an outer diameter of 150 mm and a thickness of 40 mm. The silica glass hollow cylinder was heated through a graphite heater while controlling the inner pressure of the cylinder using gaseous nitrogen, and a large silica glass tube having a diameter of 250 mm, a length of 160 mm, and a thickness of 7 mm was produced therefrom by transverse tube drawing. Referring to FIG. 1, a cutting 5 was introduced over a predetermined width along the axial direction of the large silica glass tube 1 thus obtained, and while sequentially heating and softening the tube over the entire width of the tubular axis direction by heating along the tube peripheral direction from the inner and the outer sides of the cut portion using a linear burner 3 in the temperature range of from 1800 to 2000° C., the tube was pulled apart along the tangential line of the tube to produce a flat sheet, thereby obtaining a large sheet material of synthetic silica glass 670×600 mm in size and 7 mm in thickness. The resulting large synthetic glass sheet material was then subjected to annealing treatment in an electric furnace at 1150° C. for a duration of 30 minutes to remove the strain, and was subjected to etching cleaning using 5% HF for a duration of 30 minutes. Furthermore, the sheet material was further heated and pressed in an electric furnace at 1200° C. for a duration of 2 hours by interposing a silica glass sheet between the load and the sheet material, while placing high purity carbon sheets on the upper and the lower side of the sheet material, thereby preventing contamination from occurring on the sheet material. Finally, specular polishing was applied to both planes of the large sheet material to obtain a large finished synthetic silica glass sheet material 650×550 in size and 5 mm in thickness.

Then, the samples in Examples 7 to 9 were subjected to annealing treatment under gaseous hydrogen atmosphere at a pressure of 1 atm and a temperature of 600° C. for a duration of 3 hours. In Example 4, the annealing treatment was performed under gaseous hydrogen atmosphere at a pressure of 100 atm and a temperature of 600° C. for a duration of 3 hours to obtain a sample doped with hydrogen molecules. The samples thus obtained in Examples 7 to 10 and the samples of Examples 11 and 12 not subjected to hydrogen doping treatment were subjected to measurements to obtain the concentration of OH groups, fluctuation width in concentration of OH groups per 1 cm ($\Delta$OH/cm), fluctuation width in concentration of OH groups of the entire sheet material ($\Delta$OH), concentration of hydrogen molecules, concentration of water molecules, content of chlorine element, and transmittance and the like for the irradiation of $Xe_2$ excimer laser and ArF excimer laser. The results are shown in Table 3.

TABLE 3

|  | Example 7 | Example 8 | Example 9 | Example 10 | Example 11 | Example 12 |
|---|---|---|---|---|---|---|
| Method of Synthesis | Soot Remelting | Soot Remelting | Soot Remelting | Soot Remelting | Soot Remelting | Soot Remelting |
| Concentration of OH groups (wt ppm) | 10–20 | 30–50 | 250–300 | 30–50 | 30–50 | 250–300 |
| $\Delta$OH/cm (wt ppm) | ≦10 | ≦10 | ≦10 | ≦10 | ≦10 | ≦10 |
| $\Delta$OH (wt ppm) | 10 | 20 | 50 | 20 | 20 | 50 |
| Concentration of $H_2$ (molecule/cm$^3$) | $2 \times 10^{17}$ | $2 \times 10^{17}$ | $2 \times 10^{17}$ | $2 \times 10^{19}$ | $<1 \times 10^{16}$ | $<1 \times 10^{16}$ |
| Concentration of $H_2O$ (molecule/cm$^3$) | $1 \times 10^{16}$ | $1 \times 10^{16}$ | $5 \times 10^{16}$ | $1 \times 10^{16}$ | $1 \times 10^{17}$ | $1 \times 10^{17}$ |
| Cl Concentration (wt ppm) | <10 | <10 | <10 | <10 | <10 | <10 |
| $Xe_2$ 1 amp irradiation | | | | | | |
| Initial transmittance (%) | 87 | 87 | 85 | 87 | 86 | 84 |

TABLE 3-continued

|  | Example 7 | Example 8 | Example 9 | Example 10 | Example 11 | Example 12 |
|---|---|---|---|---|---|---|
| Transmittance after irradiation (%) | 86 | 87 | 71 | 87 | 69 | 60 |
| ArF laser irradiation | | | | | | |
| Initial transmittance (%) | 90 | 90 | 89 | 90 | 90 | 89 |
| Transmittance after irradiation (%) | 88 | 89 | 88 | 90 | 62 | 64 |

The concentration of impurity elements was measured for the large synthetic silica glass sheet material produced in Examples 11 and 12. The results are given in Table 4.

TABLE 4

| Impurity Element | Example 11 | Example 12 |
|---|---|---|
| Li | 5 | 6 |
| Na | 10 | 10 |
| K | 10 | 8 |
| Mg | 8 | 5 |
| Ca | 10 | 5 |
| Ti | 1 | <1 |
| Cr | <1 | <1 |
| Mn | <1 | <1 |
| Fe | 1 | 1 |
| Co | <0.1 | <0.1 |
| Ni | <0.1 | <0.1 |
| Cu | <0.1 | <0.1 |

Note: The unit is ppb by weight (wt ppb).

COMPARATIVE EXAMPLES 7 TO 10

In Comparative Examples 7 and 8, white-colored soot bodies were each prepared by using the ultra-high purity silicon compound utilized in Example 7, and after subjecting the resulting soot bodies to dehydration treatment in electric furnace, they were vitrified and solidified under vacuum to prepare each a synthetic silica glass cylinder (soot method). The resulting silica glass cylinder was formed into a large synthetic silica glass tube by transverse tube drawing, followed by tube opening, press molding, and specular polishing to obtain a large synthetic silica glass sheet material 650×550 in size and 5 mm in thickness. In Comparative Example 8, furthermore, the large synthetic silica glass sheet material was subjected to annealing treatment under gaseous hydrogen to dope it with hydrogen molecules. The large synthetic silica glass sheet materials thus obtained were subjected to measurements as to obtain the concentration of OH groups, fluctuation width in concentration of OH groups per 1 cm ($\Delta$OH/cm), fluctuation width in concentration of OH groups of the entire sheet material ($\Delta$OH), concentration of hydrogen molecules, concentration of water molecules, content of chlorine element, and transmittance and the like for the irradiation of $Xe_2$ excimer laser and ArF excimer laser. The results are shown in Table 5.

In Comparative Example 9, an ingot was prepared by means of direct method of oxyhydrogen flame hydrolysis, using ultra-high purity $SiCl_4$ as the starting material; and in Comparative Example 10, an ingot was first prepared by means of VAD method of oxyhydrogen flame hydrolysis, and the ingot thus obtained was then shaped by hot pressing in a vacuum electric furnace using a graphite mold frame, cut into thin-layered sheet materials, and specular polished to obtain a large synthetic silica glass sheet material. The samples thus obtained were each subjected to measurements as to obtain the concentration of OH groups, fluctuation width in concentration of OH groups per 1 cm ($\Delta$OH/cm), fluctuation width in concentration of OH groups of the entire sheet material ($\Delta$OH), concentration of hydrogen molecules, concentration of water molecules, content of chlorine element, and transmittance and the like for the irradiation of $Xe_2$ excimer laser and ArF excimer laser. The results are shown in Table 5.

TABLE 5

|  | Comp. Example 7 | Comp. Example 8 | Comp. Example 9 | Comp. Example 10 |
|---|---|---|---|---|
| Method of Synthesis | Soot method | Soot method | Direct method | VAD method |
| concentration of OH groups (wt ppm) | <1 | <1 | 400~800 | 30~100 |
| $\Delta$OH/cm (wt ppm) | <1 | <1 | $\leq$200 | $\leq$50 |
| $\Delta$OH (wt ppm) | <1 | <1 | 400 | 70 |
| Concentration of $H_2$ (molecule/cm$^3$) | <1 × 10$^{16}$ | 2 × 10$^{17}$ | 9 × 10$^{17}$ | <1 × 10$^{16}$ |
| Concentration of $H_2O$ (molecule/cm$^3$) | <1 × 10$^{16}$ | <1 × 10$^{18}$ | 3 × 10$^{17}$ | 2 × 10$^{17}$ |
| Cl concentration (wt ppm) | 1.200 | 1.200 | 30 | 30 |
| Xe2 lamp irradiation | | | | |
| Initial transmittance (%) | <5 | <5 | 78~81 | 80~85 |
| Transmittance after irradiation (%) | <5 | <5 | 20~40 | 30~50 |
| ArF laser irradiation | | | | |
| Initial transmittance (%) | 87 | 88 | — | 89~90 |
| Transmittance after irradiation (%) | 42 | 43 | — | 30~45 |

Evaluation

Tables 3 and 5 read that the large synthetic silica glass sheet materials have excellent resistance against excimer radiation and are superior in uniformity. Particularly, those described in Examples 7, 8, and 10 exhibit excellent resistance against excimer radiations because of its low concentration for OH groups and high concentration for $H_2$ molecules.

On the other hand, the large synthetic silica glass sheet material described in Comparative Examples 7 and 8 are inferior in initial properties as well as in resistance against excimer radiation; those described in Comparative Examples 9 and 10 not only are inferior in resistance against excimer radiation, but have a large fluctuation width in the concentration of OH groups, and has a heterogeneous distribution in transmittance.

The large sheet material of synthetic silica-glass for high power vacuum ultraviolet rays is not only superior in initial transmittance for high output power vacuum ultraviolet rays in the wavelength range of from 160 to 200 nm, but also exhibits excellent durability and uniform characteristics over the wavelength range, and is therefore useful as a window material of dry cleaning apparatus using high output power vacuum ultraviolet rays.

The physical properties described in Examples 1 to 12 and Comparative Examples 1 to 12 above were measured according to the methods below.

(i) Measurement of OH group concentration

The measurement was performed in accordance with D. M. DODD and D. B. FRASER, Optical determination of OH in fused silica, Journal of Applied Physics, Vol. 37 (1966) p. 3911.

(ii) Measurement of fluctuation width in OH group concentration

In a cylindrical silica glass optical material 250 mm in diameter and 50 mm in thickness, the concentration of OH groups was measured at 25 points at an interval of 10 mm along the diameter direction as observed from the direction of rotation axis. The fluctuation width in OH group concentration per 1 cm ($\Delta$OH/cm) is obtained by the OH group concentration values of neighboring two points; the fluctuation width in OH groups of the entire optical material ($\Delta$OH) is obtained from the maximum value and the minimum value of the OH group concentration obtained for the 25 points; and average OH group concentration is obtained from the arithmetic average of the OH group concentration obtained for the 25 points.

(iii) Measurement of concentration of hydrogen molecules

The measurement was performed in accordance with V. K. KHOTIMCHENKO, et. al., Determining the content of hydrogen dissolved in quartz glass using the methods of Raman scattering and mass spectrometry, Journal of Applied Spectroscopy, Vol. 46, No. 6 (1987) pp. 632 to 635.

(iv) Measurement of fluctuation in concentration of hydrogen molecules

In a cylindrical silica glass optical material 250 mm in diameter and 50 mm in thickness, the concentration of $H_2$ was measured at 25 points at an interval of 10 mm along the diameter direction as observed from the direction of rotation axis The fluctuation width in $H_2$ concentration per 1 cm ($\Delta H_2$/cm) is obtained by the $H_2$ concentration values of neighboring two points; the fluctuation width in $H_2$ of the entire optical material ($\Delta H_2$) is obtained from the maximum value and the minimum value of the $H_2$ concentration obtained for the 25 points; and average $H_2$ concentration is obtained from the arithmetic average of the $H_2$ concentration obtained for the 25 points.

(v) Measurement of chlorine concentration

After dissolving in an aqueous HF solution, AgNO3 is added to perform nephelometry.

(vi) Measurement of impurities contained in silica glass

Analysis of Na, K, Mg, Ca, Ti, and Fe was performed by means of atomic absorption spectrometry, and Li, Sr, Cr, Mn, Co, Ti, and Cu were analyzed by induction coupled plasma-mass spectrometry (ICP-MS).

(vii) Measurement of fluctuation width in refractive index ($\Delta$n)

The measurement was performed by using optical interference method employing a H—Ne laser (633 nm) as the light source.

(viii) Measurement of birefringence

The measurement was performed by measuring retardation using a polarizer sheet strain gauge.

(ix) Measurement of fictive temperature

The measurement was performed in accordance with A. E. Geissberger and F. L. Galeener, Raman studies of vitreous SiO2 versus fictive temperature, Physical Review B, Vol. 28, No. 6 (1983) pp. 3266 to 3271.

(x) Measurement of fluctuation width in fictive temperature and fictive temperature In a silica glass optical material 250 mm in diameter and 50 mm in thickness, measurement is performed on two points at the central portion and the outer peripheral portion, and the fictive temperature is calculated from the difference therebetween. Furthermore, the arithmetic mean of the two values is used as the average fictive temperature.

(xi) Measurement of transmittance for a radiation of 193 nm before and after irradiation an ArF excimer laser Transmittance for a radiation of 193 nm in wavelength is obtained by irradiating, on a sample 30×20 in size and 10 mm in thickness having specular finished faces on both sides, a laser having a wavelength of 193 nm with a half band width of 3 nm and a half pulse life width of 17 nsec, an energy density of 50 mJ/cm2/shot, and repeating irradiation shots of 1×106 shots at a frequency of 100 Hz.

(xi) Measurement of transmittance for a radiation of 172 nm before and after irradiation an Xe2 excimer lamp Transmittance for a radiation of 172 nm in wavelength is obtained by irradiating for a duration of 14 days, a light having a wavelength of 172 nm with a half band width of 14 nm and an energy density of 50 mW/cm$^2$, on a sample 30×20 in size and 10 mm in thickness having specular finished faces on both sides.

What is claimed is:

1. A synthetic silica glass optical material for use with ultraviolet rays in the wavelength region from 165 to 195 nm, made from ultra-high purity synthetic silica glass, containing OH groups at a concentration of from 5 to 300 wtppm with a fluctuation in OH-group concentration ($\Delta$OH/cm) equal to or less than 10 wtppm, containing hydrogen molecules at a concentration of from $1\times10^{17}$ to $1\times10^{19}$ molecule/cm$^3$ with a fluctuation in hydrogen molecule concentration ($\Delta H_2$/cm) equal to or less than $1\times10^{17}$ molecule/cm$^3$, and containing chlorine at a concentration equal to or less than 50 wtppm.

2. A synthetic silica glass optical material as claimed in claim 1, wherein the synthetic silica glass has a concentration equal to or less than 5 wtppb each of alkali elements, equal to or less than 1 wtppb each of alkaline earth metal elements, and equal to or less than 0.1 wtppb each of transition metal elements.

3. A synthetic silica glass optical material as claimed in claim 2, wherein the entire optical material has a fluctuation in OH group concentration ($\Delta$OH) equal to or less than 30 wtppm, and a fluctuation in hydrogen molecule concentration ($\Delta H_2$) equal to or less than $3\times10^{17}$ molecule/cm$^3$.

4. A synthetic silica glass optical material as claimed in claim 2, wherein the concentration of water molecules is in a range equal to or less than $1\times10^{17}$ (molecule/cm$^3$).

5. A synthetic silica glass optical material as claimed in claim 2, wherein the optical material as a whole has a fictive temperature ($T_f$) in a range of from 700 to 1000° C., with a fluctuation in fictive temperature ($\Delta T_f$) equal to or less than 50° C.

6. A synthetic silica glass optical material as claimed in claim 2, wherein the optical material as a whole has a fluctuation in refractive index ($\Delta$n) equal to or less than $2\times10^{-6}$, and a birefringence equal to or less than 1 nm/cm.

7. A synthetic silica glass optical material as claimed in claim 2, wherein the material has a shape of a sheet, wherein the fluctuation in the concentration of OH groups over the entire sheet is equal to or less than 50 wt ppm.

8. A synthetic silica glass optical material as claimed in claim 1, wherein the entire optical material has a fluctuation in OH group concentration ($\Delta$OH) equal to or less than 30 wtppm, and a fluctuation in hydrogen molecule concentration ($\Delta H_2$) equal to or less than $3 \times 10^{17}$ molecule/cm$^3$.

9. A synthetic silica glass optical material as claimed in claim 6, wherein the concentration of water molecules is in a range equal to or less than $1 \times 10^{17}$ (molecule/cm$^3$).

10. A synthetic silica glass optical material as claimed in claim 8, wherein the optical material as a whole has a fictive temperature ($T_f$) in a range of from 700 to 1000° C., with a fluctuation in fictive temperature ($\Delta T_f$) equal to or less than 50° C.

11. A synthetic silica glass optical material as claimed in claim 8, wherein the optical material as a whole has a fluctuation in refractive index ($\Delta n$) equal to or less than $2 \times 10^{-6}$, and a birefringence equal to or less than 1 nm/cm.

12. A synthetic silica glass optical material as claimed in claim 8, wherein the material has a shape of a sheet, wherein the fluctuation in the concentration of OH groups over the entire sheet is equal to or less than 50 wt ppm.

13. A synthetic silica glass optical material as claimed in claim 1, wherein the concentration of water molecules is in a range equal to or less than $1 \times 10^{17}$ (molecule/cm$^3$).

14. A synthetic silica glass optical material as claimed in claim 13, wherein the optical material as a whole has a fictive temperature ($T_f$) in a range of from 700 to 1000° C., with a fluctuation in fictive temperature ($\Delta T_f$) equal to or less than 50° C.

15. A synthetic silica glass optical material as claimed in claim 13, wherein the optical material as a whole has a fluctuation in refractive index ($\Delta n$) equal to or less than $2 \times 10^{-6}$, and a birefringence equal to or less than 1 nm/cm.

16. A synthetic silica glass optical material as claimed in claim 13, wherein the material has a shape of a sheet, wherein the fluctuation in the concentration of OH groups over the entire sheet is equal to or less than 50 wt ppm.

17. A synthetic silica glass optical material as claimed in claim 1, wherein the optical material as a whole has a fictive temperature ($T_f$) in a range of from 700 to 1000° C., with a fluctuation width in fictive temperature ($\Delta T_f$) equal to or less than 50° C.

18. A synthetic silica glass optical material as claimed in claim 17, wherein the optical material as a whole has a fluctuation in refractive index ($\Delta n$) equal to or less than $2 \times 10^{-6}$, and a birefringence equal to or less than 1 nm/cm.

19. A synthetic silica glass optical material as claimed in claim 6, wherein the material has a shape of a sheet, wherein the fluctuation in the concentration of OH groups over the entire sheet is equal to or less than 50 wt ppm.

20. A synthetic silica glass optical material as claimed in claim 1, wherein the optical material as a whole has a fluctuation in refractive index ($\Delta n$) equal to or less than $2 \times 10^{-6}$, and a birefringence equal to or less than 1 nm/cm.

21. A synthetic silica glass optical material as claimed in claim 7, wherein the material has a shape of a sheet, wherein the fluctuation in the concentration of OH groups over the entire sheet is equal to or less than 50 wt ppm.

22. A synthetic silica glass optical material as claimed in claim 1, wherein the material has a shape of a sheet, wherein the fluctuation in the concentration of OH groups over the entire sheet is equal to or less than 50 wt ppm.

23. A method for producing the synthetic silica glass optical material for use with ultraviolet rays in the region of 165 to 195 nm according to claim 1, comprising subjecting a silica glass ingot obtained from an ultra-high purity silicon compound by flame hydrolysis to a homogenization treatment for the concentration of OH groups as well as for the concentration of hydrogen molecules and then processing the resulting ingot into the synthetic silica glass optical material.

24. A method as claimed in claim 23, wherein the homogenization treatment for the concentration of OH groups comprises zone heating and softening the silica glass ingot, and then sequentially rotating and mixing the resulting silica glass ingot.

25. A method as claimed in claim 24 wherein the homogenization treatment for the concentration of hydrogen molecules comprises heating the silica glass ingot in the temperature range of from 600 to 1200° C. under gaseous hydrogen.

26. A method as claimed in claim 24, wherein a treatment for setting fictive temperature is applied after the silica glass ingot is subjected to the homogenization treatment for the concentration of OH groups and the same for hydrogen molecules.

27. A method as claimed in claim 24, wherein for producing a large sheet material the method further comprises forming a white-colored soot body by means of oxyhydrogen flame hydrolysis and using a high purity silicon compound as the starting material; adjusting the concentration of OH groups of the resulting soot body; vitrifying the soot body into transparent glass to obtain a cylindrical synthetic silica glass body; producing a synthetic silica glass tube by means of transverse tube drawing; and shaping the resulting tube into a large sheet material by tube opening process.

28. A method as claimed in claim 23, wherein the homogenization treatment for the concentration of hydrogen molecules comprises heating the silica glass ingot in the temperature range of from 600 to 1200° C. under gaseous hydrogen.

29. A method as claimed in claim 28, wherein a treatment for setting fictive temperature is applied after the silica glass ingot is subjected to the homogenization treatment for the concentration of OH groups and the same for hydrogen molecules.

30. A method as claimed in claim 28, wherein for producing a large sheet material the method further comprises forming a white-colored soot body by means of oxyhydrogen flame hydrolysis and using a high purity silicon compound as the starting material; adjusting the concentration of OH groups of the resulting soot body; vitrifying the soot body into transparent glass to obtain a cylindrical synthetic silica glass body; producing a synthetic silica glass tube by means of transverse tube drawing; and shaping the resulting tube into a large sheet material by tube opening process.

31. A method as claimed in claim 23, wherein a treatment for setting fictive temperature is applied after the silica glass ingot is subjected to the homogenization treatment for the concentration of OH groups and the same for hydrogen molecules.

32. A method as claimed in claim 31, wherein for producing a large sheet material the method further comprises forming a white-colored soot body by means of oxyhydrogen flame hydrolysis and using a high purity silicon compound as the starting material; adjusting the concentration of OH groups of the resulting soot body; vitrifying the soot body into transparent glass to obtain a cylindrical synthetic silica glass body; producing a synthetic silica glass tube by means of transverse tube drawing; and shaping the resulting tube into a large sheet material by tube opening process.

33. A method as claimed in claim 23, wherein for producing a large sheet material the method further comprises forming a white-colored soot body by means of oxyhydrogen flame hydrolysis and using a high purity silicon compound as the starting material; adjusting the concentration of OH groups of the resulting soot body; vitrifying the soot body into transparent glass to obtain a cylindrical synthetic silica glass body; producing a synthetic silica glass tube by means of transverse tube drawing; and shaping the resulting tube into a large sheet material by tube opening process.

34. A synthetic silica glass optical material for use with ultraviolet rays in the wavelength region from 165 to 175 nm, made from ultra-high purity synthetic silica glass, containing OH groups at a concentration of from 5 to 100 wtppm with a fluctuation in OH-group concentration ($\Delta$OH/cm) equal to or less than 10 wtppm, containing hydrogen molecules at a concentration of from $1\times10^{17}$ to $1\times10^{19}$ molecule/cm$^3$ with a fluctuation in hydrogen molecule concentration ($\Delta H_2$/cm) equal to or less than $1\times10^{17}$ molecule/cm$^3$, and containing chlorine at a concentration equal to or less than 50 wtppm.

35. A synthetic silica glass optical material as claimed in claim 34, wherein the synthetic silica glass has a concentration equal to or less than 5 wtppb each of alkali metal elements, equal to or less than 1 wtpbb each of alkaline earth metals, and equal to or less than 0.1 wtpbb each of transition metal elements.

36. A synthetic silica glass optical material as claimed in claim 34, wherein the entire optical material has a fluctuation in OH group concentration ($\Delta$OH) equal to or less than 30 wtppm, and a fluctuation in hydrogen molecule concentration ($\Delta H_2$) equal to or less than $3\times10^{17}$ molecule/cm$^3$.

37. A synthetic silica glass optical material as claimed in claim 34, wherein the concentration of water molecules is in a range equal to or less than $1\times10^{17}$ (molecule/cm$^3$).

38. A synthetic silica glass optical material as claimed in claim 34, wherein the optical material as a whole has a fictive temperature ($T_f$) in a range of from 700 to 1000° C., with a fluctuation in fictive temperature ($\Delta T_f$) equal to or less than 50° C.

39. A synthetic silica glass optical material as claimed in claim 34, wherein the optical material as a whole has a fluctuation in refractive index ($\Delta n$) equal to or less than $2\times10^{-6}$, and a birefringence equal to or less than 1 nm/cm.

40. A synthetic silica glass optical material as claimed in claim 34, wherein the material has a shape of a sheet, wherein the fluctuation in the concentration of OH groups over the entire sheet is equal to or less than 50 wt ppm.

* * * * *